United States Patent [19]

Aoki

[11] 4,037,125
[45] July 19, 1977

[54] SMALL-SIZED DIRECT CURRENT ROTARY ELECTRIC APPLIANCE

[75] Inventor: Kanemasa Aoki, Yokohama, Japan

[73] Assignees: Canon Kabushiki Kaisha; Canon Seiki Kabushiki Kaisha, both of Tokyo, Japan

[21] Appl. No.: 620,380

[22] Filed: Oct. 7, 1975

[30] Foreign Application Priority Data

Oct. 11, 1974  Japan .............................. 49-116978

[51] Int. Cl.² ........................................... H02K 13/00
[52] U.S. Cl. ............................ 310/248; 310/40 MM; 310/237
[58] Field of Search .................. 310/40 MM, 46, 177, 310/237, 154, 241, 242, 243, 244, 246, 247, 229, 230, 231, 232, 248–252, 219

[56] References Cited

U.S. PATENT DOCUMENTS

| | | | |
|---|---|---|---|
| 2,818,518 | 12/1957 | Phaneuf | 310/237 |
| 2,931,999 | 4/1960 | Lemmerman | 310/232 |
| 3,185,951 | 5/1965 | LeBeau | 310/232 |
| 3,234,420 | 2/1966 | Lindner | 310/248 |
| 3,488,842 | 1/1970 | Rochette | 310/249 |
| 3,564,168 | 2/1971 | Bigg | 310/232 |
| 3,705,996 | 12/1972 | Ahmed | 310/232 |

FOREIGN PATENT DOCUMENTS

| | | | |
|---|---|---|---|
| 1,293,318 | 4/1969 | Germany | 310/237 |
| 1,111,527 | 5/1968 | United Kingdom | 310/237 |

*Primary Examiner*—R. Skudy
*Attorney, Agent, or Firm*—Fitzpatrick, Cella, Harper & Scinto

[57] ABSTRACT

A small-sized direct current rotary electric appliance comprises a stator provided with a cylindrically shaped permanent magnet. A rotary armature rotates in the magnetic field of said permanent magnet, and brushes are fixedly provided on a part of said stator. The rotary armature is constructed with a rotor shaft, a soft magnetic core being fixedly provided on the rotor shaft with a plurality of winding continuously wound for a predetermined number of turns around the core in such a way that the portions of the windings located at both end surfaces of the core in the axial direction thereof constitute terminal connections. The portions located on the periphery of the core in the axial direction thereof are substantially parallel to the rotor shaft, and a disc-shaped commutator plate is disposed in at least one of recesses formed at both end surface parts of the core in its axial direction by both end surfaces of the core in its axial direction and with the terminal connections of the windings raised above both end surfaces. The commutator plate is fixedly provided on the rotor shaft so as to be substantially perpendicular thereto. The brushes are each formed of an integral structure consisting of a first spring element in a right-angled U-shape and a second spring element supporting the first spring element approximately at the middle of the parallel arm portions thereof, the open ends of the first spring element forming contact points, and the ends of the second spring element opposite to the above-mentioned supporting ends forming the securing ends therefor.

6 Claims, 13 Drawing Figures

SMALL-SIZED DIRECT CURRENT ROTARY ELECTRIC APPLIANCE

BACKGROUND OF THE INVENTION

1. Field of the Invention

The present invention relates to a small-sized direct current rotary electric appliance, and, more particularly, it is concerned with an improved structure of the brush therefor.

2. Description of the Prior Arts

A recent trend in the field of small-sized direct current rotary electric appliances is the demand for such appliances having a flattened configuration, wherein the axial length thereof is made as short as possible.

Such flat rotary appliance with shortened axial length is mainly utilized as a motor for audio equipment, e.g., as a motor for stereo-phonic equipment, etc. in automobiles. Since the recent oil crisis, the world has been demanding, as a general tendency, more compact cars for saving the limited natural resource, and also, from the standpoint of designing cars adapted for a safer driving norm, various gauges and instruments installed in dash-board of the automobiles which appeal to the sense of sight are required to be given more space than ever before. In the latter event, however, when a larger space is provided within a certain limited area of the dash-board for such instruments appealing to the eye-sight, the space for stereo-phonic equipment, etc. which utilize the sense of hearing would naturally be sacrificed. Under such circumstances, the attempt to flatten rotary electric appliances like motors in their axial directions is highly significant in view of miniaturization and flattening of the audio equipment, particularly, for automobiles.

As a method for realizing such flat-type appliance using the armature as the rotor, there has heretofore been practiced a way, in which the commutator is arranged along the axial direction of rotor shaft. A step further, there has also been developed such flattened rotary electric appliance, as seen in U.S. Pat. No. 2,818,518, FIG. 4, for example, wherein the commutator in a disc-shape is fixed on the rotor shaft substantially perpendicularly thereto so that the brushes may be in contact with the surface of the commutator in a direction substantially parallel thereto, thereby reducing the axial length of the commutator.

The motor disclosed in the U.S. Pat. No. 2,818,518 is in such a construction that both ends of the rotor shaft are rotatably supported on the motor casing through bearings, and a lubricant has to be supplied between the rotor shaft and the bearings in order to reduce the friction therebetween and facilitate rotation of the rotor shaft. However, in the case of a motor as disclosed in U.S. Pat. No. 2,818,518, wherein the armature is used as the rotor, when the thus supplied lubricant flows along the rotor shaft and penetrates into the armature windings, the armature windings are heated to cause eventual damage or other mal-effect thereto. In such motor, therefore, it is necessary to provide an oil thrower, or slinger, on the rotor shaft at both sides of the armature winding. However, in the motor of a type, wherein brushes in the form of a cantilever spring are caused to conact on the surface of the commutator along a direction substantially parallel thereto as taught in U.S. Pat. No. 2,818,518, when the oil throwers are to be provided, the member came into contact with the brushes to hinder assembly of the motor. Moreover, such oil throwers, if provided exclusively for the purpose of slinging the lubricant oil, inevitably increase the axial length of the rotor for the axial length of such members, which is therefore not desirable for realizing flattening of the motor.

Besides the abovementioned U.S. Pat. No. 2,818,518, a motor, in which a disc-shaped commutator is fixed on the rotor shaft in a manner to be substantially perpendicular thereto, and the brushes are caused to contact the surface of the commutator along a direction substantially parallel thereto, is also disclosed in British Pat. No. 1,111,527. In such motor, the contact point between the brushes and the commutator has to be brought to as close a position as possible with respect to the axis of rotation so as to minimize the loss of torque resulting from the friction between the brushes and the commutator, due to which requirement the brushes are limited in their width and are formed in an elongated shape. Consequently, the brush disclosed in U.S. Pat. No. 2,818,518 (FIG. 4) is formed as a very thin and long rod, one end of which is fixed and the other end of which is free to serve as a contacting end to the commutator. Such brush is accompanied by various defects in that it undergoes vibrations with the position at which it is fixed being made the fulcrum thereof and, since the distance from the fulcrum to the free contacting end thereof is long, the brush vibrates with a very large amplitude. When the motor is rotated, stable contact of the brushes with the commutator is hindered, thereby causing not only undesirable noise but also detachment of the brush from the commutator with eventual interruption of electric conduction. In order to avoid the drawbacks of the brush as disclosed in U.S. Pat. No. 2,818,518, the British Pat. No. 1,111,527 provides a brush of simply increased width, one end of which is fixed, and the other end of which is formed in an extremely thin plate spring and made free to serve as the contacting end with the commutator. Even in this case, however, the brush as a whole undergoes vibrations with the position at which it is fixed, being made the fulcrum and, since the distance from the fulcrum to the free contacting end is long, the brush vibrates with a very large amplitude when the motor is rotated, thus hindering stable contact of the brush with the commutator. Therefore, not only undesirable noise but also detachment of brush from the commutator with eventual interruption of electric conduction is caused. Thus, the simple increase in thickness or width of the brush does by no means constitute a satisfactory solution to the abovementioned drawbacks.

Further, in order to alleviate the abovementioned drawbacks, there has also been known already a brush structure, as disclosed in Japanese Patent Publication No. 39-5905, wherein a plate spring of a shape having relatively similar longitudinal and transversal lengths which may be circular or square is provided with a fixing hole in the center part thereof, and in the outer periphery of which a U-shape or a right-angled U-shape opening or window is formed to construct elastic arm portions on both sides of the fixing hole in a symmetrical manner. Two contact pieces which contact with the commutator are integrally formed outside of the center part between the two elastic arm portions to increase the width of the brush, and to reduce length of the brush. Furthermore, DAS No. 1,293,318 discloses a similar brush structure consisting of a plate spring of a shape having relatively similar longitudinal and transversal lengthes either circular or a square and provided with a fixing hole in the center part thereof, in the outer periphery of which a U-shape, or a right-angled U-shape opening or window is formed therearound to constract elastic arm portions on both side of the fixing hole in a symmetrical manner. Two contact pieces contacting with the commutator are formed integrally between the two elastic arm portions, and at an outside position where it is nearer to one of the arm portions to thereby widen the width of the brush and to shorten its length.

However, such brushes as disclosed in Japanese Patent Publication No. 39-5905 and DAS No. 1,293,318 undergo a concentrated bending moment at the connecting portion between the center part provided with the fitting hole and the elastic arm portions, i.e., at the extreme end of the U-shape, or right-angled U-shape opening or window, as a result of which they bend at the connecting part which acts as the fulcrum, while tending to be twisted. Consequently, such brushes are unable to exhibit spring characteristics to a satisfactory and effective degree, and also lack stability when they contact the commutator.

SUMMARY OF THE INVENTION

The first object of the present invention is to provide an improved rotary electric appliance which is free from the abovementioned drawbacks in the conventional direct current rotary electric appliances.

The second object of the present invention is to provide a flat, small-sized direct current rotary electric appliance having a shortened axial length.

The third object of the present invention is to provide a small-sized direct current rotary electric appliance, wherein a core supporting member per se fixedly provided on the rotor shaft is given the function of an oil thrower, thereby eliminating the conventional oil thrower for the sole purpose of slinging oil, so as to flatten the entire appliance for at least the axial length which has so far been required by such oil throwers.

The fourth object of the present invention is to provide a flattened, small-sized direct current rotary electric appliance constructed with a rotor shaft, a soft magnetic core fixedly provided on the rotor shaft, a plurality of windings continuously wound for a predetermined number of turns around the core in such a way that the portions of the winding located at both end surfaces of the core in the axial direction thereof constitute terminal connecting portions and the portions located on the axial periphery of the core in the axial direction thereof are substantially parallel to the rotor shaft, and a disc-shaped commutator disposed in at least one of recesses formed at both end surface parts of the core in its axial direction by both end surfaces of the core in its axial direction and the end connecting portions of the windings raised above both end surfaces, and fixedly provided on the rotor shaft so as to be approximately perpendicular thereto.

The fifth object of the present invention is to provide a small-sized direct current rotary electric appliance, wherein the brush is formed of an integral structure consisting of a first spring element in a right-angled U-shape made of a thin metal plate and a second spring element also in a right-angled U-shape supporting the first spring element substantially at the middle of the parallel arm portions thereof, the end part of the second spring element opposite to the side where the first spring element is supported is made a fixed end, and the U-shaped open end of the first spring element constitutes a contact part, thereby reducing the fluctuation in the contact pressure of the brush to the commutator, and securing low noise level and smooth rotation.

Other objects of the present invention will be made clear from the following descriptions with reference to the accompanying drawings.

DESCRIPTION OF THE PREFERRED EMBODIMENT

The small-sized direct current rotary electric appliance of the present invention will be explained in detail with respect to an embodiment thereof shown in the accompanying drawings.

Figure 10:
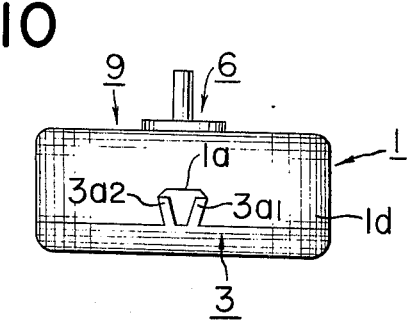
FIG. 10 is a front view of one embodiment of the small-sized direct current rotary electric appliance of the present invention, showing its outer appearance.
Figure 11:
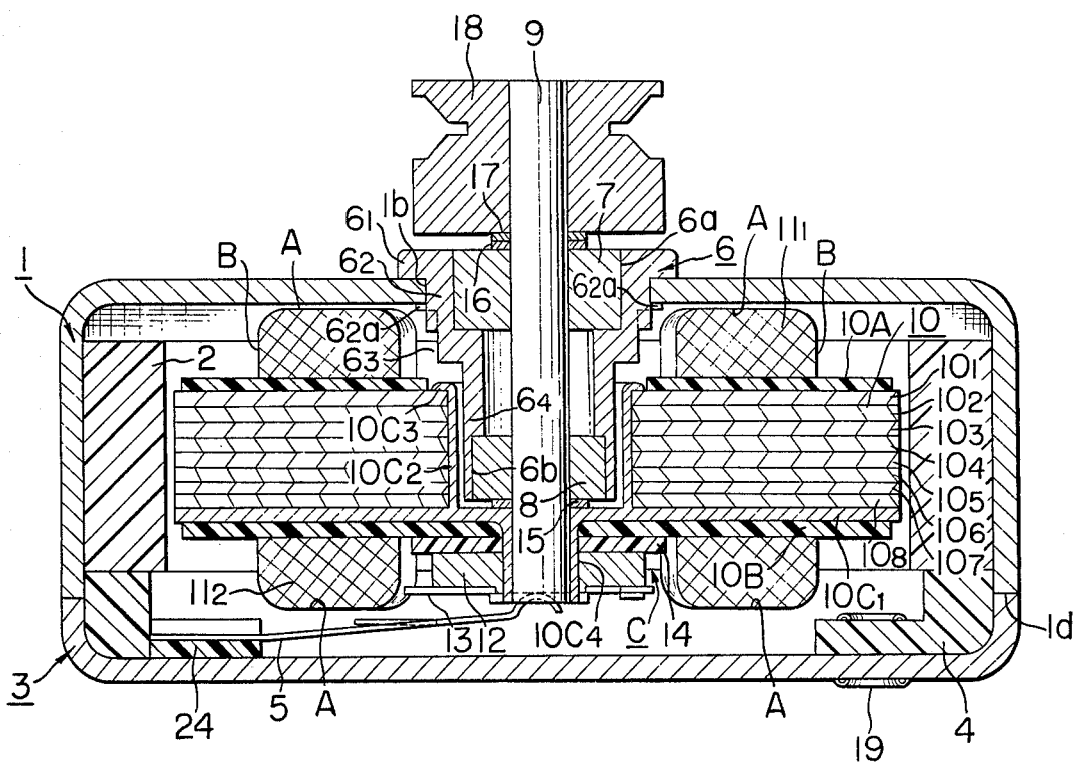
FIG. 11 is a longitudinal cross-sectional view of the small-sized direct current rotary electric appliance of the present invention shown in FIG. 10.
Figure 12:
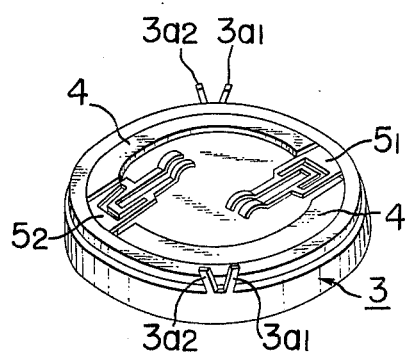
FIG. 12 is a perspective view indicating the arrangement of the elements relating to the rear cover 3 shown in FIGS. 10 and 11.

FIG. 10 is a front view of an embodiment of the small-sized direct current rotary electric appliance of the present invention, showing its outer appearance. FIG. 11 is a longitudinal cross-sectional view of the rotary electric appliance shown in FIG. 10. FIG. 12 is a perspective view showing an arrangement of the component members relative to the rear cover shown in FIGS. 10 and 11. In those FIGS. 10 to 12, there is shown a main body casing 1 in a drag-cup shape with one end 1d thereof being opened. The main body casing 1 is provided with an opening 1b in the bottom part thereof for fixing a bearing member, and, at the same time, the open end $1d$ is formed therein with a female dovetail $1a$ recessed from the open end $1d$. A rear cover 3 is selectively mounted on the open end $1d$ to close the open end of the main body casing. On this rear cover, there are formed two-branched male dovetails $3a_1$ and $3a_2$ to be engaged with the female dovetail $1a$ for firmly fixing the rear cover 3 and the main body casing 3 at the time of closing the open end $1d$ of the main body casing. The engagement between the main body casing 1 and the rear cover 3 is carried out by first bending the male dovetails $3a_1$ and $3a_2$ outwardly from the root part thereof so that the dovetails do not collide with the open end $1d$ of the main body casing 1, and, after the main body casing 1 and the rear cover 3 are brought to their mutually engaging position, the outwardly bent male dovetails are returned to the original position to thereby achieve the engagement between the male dovetail and the female dovetail. Inversely, the disengagement of the rear cover 3 from the main body casing 1 can be easily realized by again bending the male dovetails $3a_1$ and $3a_2$ outwardly, thereby disengaging the male dovetails from the female dovetail.

Figure 6:
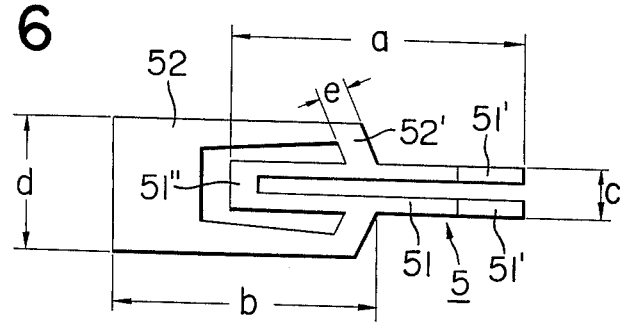
FIG. 6 is a plan view indicating one embodiment of the brush to be employed in the small-sized direct current rotary electric appliance of the present invention.
Figure 7:
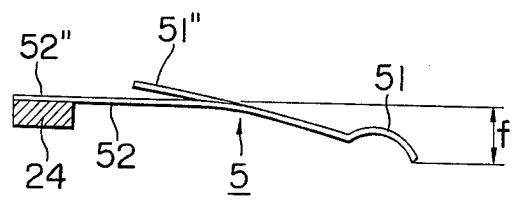
FIG. 7 is a side elevational view of the brush shown in FIG. 6 in its bent state.
Figure 8:
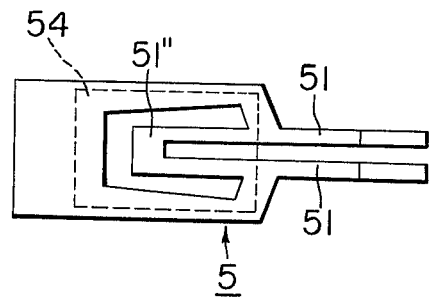
FIG. 8 is a plan view of another embodiment which is a further improvement of the brush shown in FIGS. 6 and 7.
Figure 9:
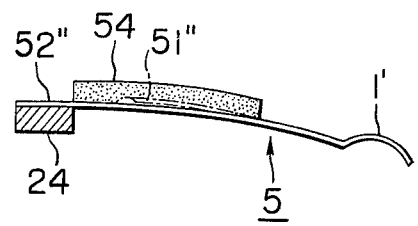
FIG. 9 is a side elevational view of the brush shown in FIG. 8 in its bent state.

A hollow cylindrical bearing housing 6 is mounted on the main body casing 1 in a manner so as to protrude into the main body casing from the opening $1b$ thereof. The bearing housing is so constructed that its outer diameter stepwise reduces in the sequence of $6_1 > 6_2 > 6_3 > 6_4$ from the opening $1b$ of the main body casing toward the interior of the main body casing 1. The portion $6_2$ of the bearing housing 6 is the part to be mounted on the opening $1b$ of the main body casing 1, and, after the part $6_2$ is fitted on the opening $1b$ of the main body casing 1, a part $6_2a$ which is a part of this portion $6_2$ is caulked against the main body casing 1, thereby firmly fixing the bearing housing 6 to the main body casing 1 in conjunction with a flange portion $6_1$. Further, the bearing housing 6 is provided in its inner periphery with recesses $6a$ and $6b$ for fitting and accomodating bearings 7 and 8. A permanent magnet in a hollow cylindrical shape is fixed on the inner peripheral surface of the main body casing 1. Brushes $5_1$ and $5_2$ are electrically connected with wires (not shown) located outside the main body casing 1. The brushes $5_1$ and $5_2$ are so constructed as shown in FIGS. 6 and 7, and, depending on circumstances, a brush of a structure as shown in FIGS. 8 and 9 may be used. The detailed structure of the brushes shown in FIGS. 6 and 7 or in FIGS. 8 and 9 will be explained later.

Thus, the above-described principal component parts of the main body casing 1, permanent magnet 2, rear cover 3, and bearing housing 6 constitute the stator of the rotary electric appliance.

Figure 13:
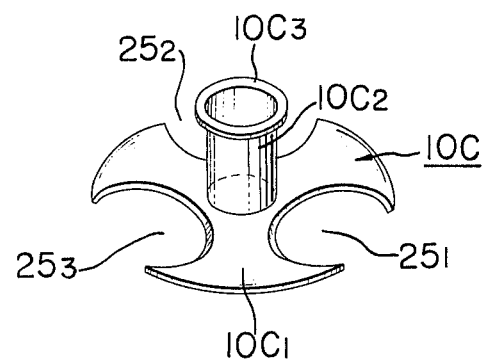
FIG. 13 is a perspective view indicating a specific configuration of the core support element 10C shown in FIG. 11.

There are further shown a rotary armature shaft 9 rotatably supported by the bearings 7 and 8, and a core supporting element 10C of a soft magnetic material fixedly provided on the rotary armature shaft 9. The configuration of the core supporting element 10C is as shown in FIG. 13, which comprises a disc part $10C_1$, a cylindrical part $10C_2$, a flange part $10C_3$, and a fixing part $10C_4$. The disc part $10C_1$ is in the form of a circular plate, in one part of which there are provided notches 25. Core plates $10_1$–$10_8$ are fixedly provided on the core supporting element 10C substantially perpendicularly with respect to the rotary armature shaft in such a manner that the center part thereof may be fitted on the cylindrical part $10C_2$ of the core supporting element 10C. Windings $11_1$ and $11_2$ are respectively wound around the laminated core plates $10_1$–$10_8$ for a predetermined number of turns through insulators 10A and 10B. In the present embodiment, there should be provided at least three windings although only two of them are shown in FIG. 11. These three windings are composed of a winding $11_1$, a part of which is located in a notched groove $25_1a$, and a notched groove $25_2a$, a winding $11_2$, a part of which is likewise located in a notched groove $25_3a$ and the notched groove $25_2a$, and a winding $11_3$, a part of which is likewise located in the notched grooves $25_3a$ and $25_1a$. These notched grooves $25_1a$, $25_2a$, and $25_3a$ are formed by the core plates $10_1$–$10_8$, each having notches $25_1$, $25_2$, and $25_3$ in conformity to the shape of the circular disc portion $10C_1$ of the core supporting element 10, and each being laminated on the core supporting element one after another. These windings $11_1$, $11_2$ and $11_3$ are wound in such a manner that the portions A thereof located on both end surfaces of the laminated cores $10_1$–$10_8$ in the axial direction constitute the terminal connecting portions, and the portions B thereof located on the peripheral surface of the laminated cores $10_1$–$10_8$ in the axial direction may be substantially parallel to the rotary armature shaft 9. An insulating plate 12 constitutes a part of the flat commutator disposed at the fixing part $10C_4$ of the core supporting element 10C. The insulating plate 12 is provided thereon with a plurality of conductive parts 13 of the commutator. A printed resistor board 14 for extinguishing sparks is arranged between the insulating plate 12 and the insulating plate 10B. The rotary armature 10 is thus constructed with these laminated cores $10_1$–$10_8$, core supporting element 10C, insulators 10A and 10B, windings $11_1$, $11_2$ and $11_3$, insulating plate 12, conductive elements 13, printed resistor board 14, and rotary armature shaft 9, as the principal components. The core supporting element 10C of the rotary armature and the bearing housing 6 of the stator are relatively positioned in such a manner that the portion $6_4$ of the bearing housing 6 is located in the bore of the cylindrical part $10C_2$ of the core supporting element 10C.

Further, reference numeral 15 designates a spacer for keeping the surfaces in the axial direction of the bearing housing 6 and the core supporting element 10C separated so that they may not contact each other, numeral 18 indicates a pulley fixedly provided on the rotary armature shaft 9, and numerals 16 and 17 indicate spacers for keeping the surfaces in the axial direction of the pulley 18 and the bearing housing 6 so that they may not contact each other.

The small-sized direct current rotary electric appliance of the present invention thus constructed is advantageous in:

a. that, as the rotary armature shaft 9 is not supported by both main body casing 1 and the rear cover 3, but the side where the commutators (12, 13) are fixedly provided is rendered a free end so that the oil thrower can be omitted at the side of the free end, and the axial length of the rotary electric appliance can be reduced for the oil thrower;

b. that, since a part of the bearing housing 6 which rotatably supports the rotary armature shaft 9 is so disposed as to be protruded into the tubular part $10C_2$ of the core supporting element 10C, the axial length of the rotary appliance need not be taken longer in spite of distance between the bearings 7 and 8 being taken longer to stabilize the support for the rotary armature shaft 9;

c. that the commutators (12, 13) are accommodated in at least one of the recesses C, which are eventually formed at both end surfaces of the core ($10_1$–$10_8$, 10C) in the axial direction thereof, when the winding is wound therearound, with both end surfaces of the core ($10_1$–$10_8$, 10C) and the terminal connecting portions A of the windings raised above both end surfaces in the axial direction thereof, so that the axial length of the rotary electric appliance can be reduced for the length of the commutators in comparison with conventional rotary electric appliance where the commutators are located outside the terminal connecting portions.

As will be understood from the above explanations (a), (b) and (c) as well as from FIG. 11, the axial length of the armature in the rotary electric appliance according to the present invention can be substantially equal to the axial length of the windings $11_1$, $11_2$ and $11_3$ so that the rotary electric appliance of the present invention utilizing such armature is remarkably flattened.

In addition to such flattened rotary electric appliance, the present invention is characterized by the structure of the brush 5.

Figure 1:
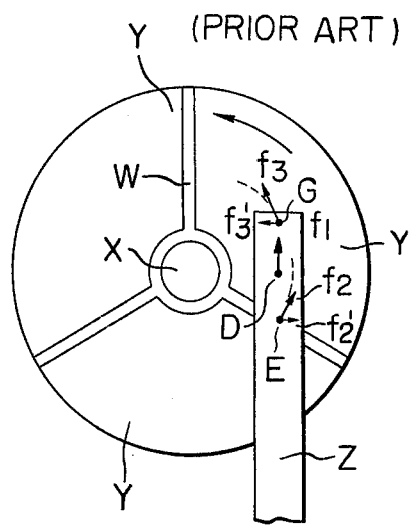
FIG. 1 is a plan view explaining the relative arrangement of the commutator and brush in an ordinary small-sized direct current rotary electric appliance utilizing a flat commutator.

The relative arrangement between the brush and a flat disc-shaped commutator in the small-sized direct current rotary electric appliance of the present invention employing the flat, disc-shaped commutator is as shown in FIG. 1.

Referring to FIG. 1, there are shown a rotary armature shaft X, conductive elements Y of the commutator, an insulator W of the commutator and the brush Z. A point D on a certain location at the brush Z which contacts the disc-shaped commutator in the direction perpendicular to the radius thereof is designated as the normal contact point. Also, there possibly exist on the brush a contact point E before the contact point D and another contact point G after the contact point D with respect to the rotational direction of the commutator (as shown in an arrow mark), at both points of which the brush Z contacts the commutator, but not at the point D seemingly due to an error at the time of manufacturing the brush as well as fitting the same on the rotary electric appliance. Considering the frictional force due to sliding between the brush and the commutator at each of the abovementioned contact points, the frictional force $f_1$ at the contact point D between the brush Z and the conductive part Y of the commutator due to its rotation coincides with the direction of extension of the brush Z. In case, however, the contact takes place at either the incorrect point E or F, there is operated a force $f_2'$ or $f_3'$ as a component of the force $f_2$ or $f_3$ in the direction perpendicular to the extension of the brush Z, the component of the force of which thus gives rise to vibrations on the elongated brush. In consideration of such case as discussed above, it is apparently preferable that the brush be manufactured in such a manner as to realize the accurate contact on the exact or normal point D between the brush and the commutator. However, in the case of the small-sized direct current rotary electric appliances which are manufactured under the industrialized mass production system, it is difficult to always pinpoint the contact at D. Consequently, it is desirable that the brush be provided with rigidity against a force in the lateral direction.

Figure 2:
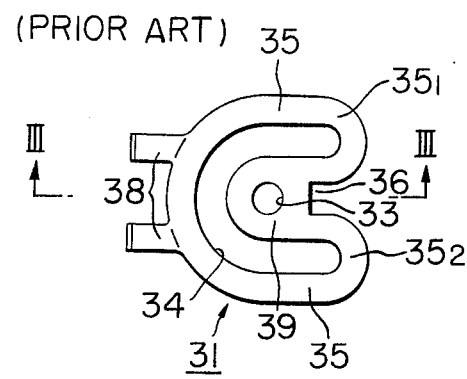
FIG. 2 is a plan view indicating the structure of a conventional brush employed in a small-sized direct current rotary electric appliance utilizing a flat commutator.
Figure 3:
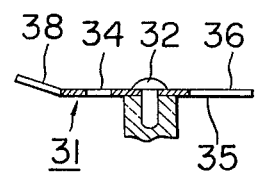
FIG. 3 is a cross-sectional view of the brush shown in FIG. 2 taken along the line III—III thereof as viewed from the direction of arrow, wherein the brush is shown to be fixed to the rotary electric appliance by means of a fixing screw.

Japanese Patent Publication No. 39-5905 discloses as shown in FIGS. 2 and 3 of the accompanying drawing a brush of a configuration capable of retaining rigidity against a lateral force acting thereon. That is to say, the brush shown in FIGS. 2 and 3 is in such a construction that at approximately the center part 39 of a plate spring 31 of a shape, wherein longitudinal and transverse lengths thereof are relatively similar, there is formed a fitting hole 33 for inserting a fitting rivet 32, then a U-shaped opening 34 of a desired width is punched out around the hole 33 to thereby form an elastic arm portion 35 at both sides of the plate spring 31, further a notch 36 is provided at a position contiguous to the fitting hole 33 and at one side of the plate spring 31 between both ends of the opening 34 to supplement elasticity of the arm portions, and two contact elements 38 projecting outwardly from two points located at approximately the center part of the two arm portions 35, and for contacting with the commutator are integrally formed.

However, the conventional brush as shown in FIGS. 2 and 3 is subjected to a concentrated bending stress to be generated at the connecting portions $35_1$ and $35_2$ between the center part 39 thereof where the fitting hole 33 is formed and the elastic arm portion 35 with the result that breakage or plastic deformation would apprehensively take place with the brush, unless the connecting portions $35_1$ and $35_2$ are given augmented mechanical strength. In this consequence, pressure of the contact elements 38 against the commutator must also be increased, which inevitably increases the contact friction between the commutator and the contacting elements 38 to impose undesirably high load to the rotary electric appliance.

Figure 4:
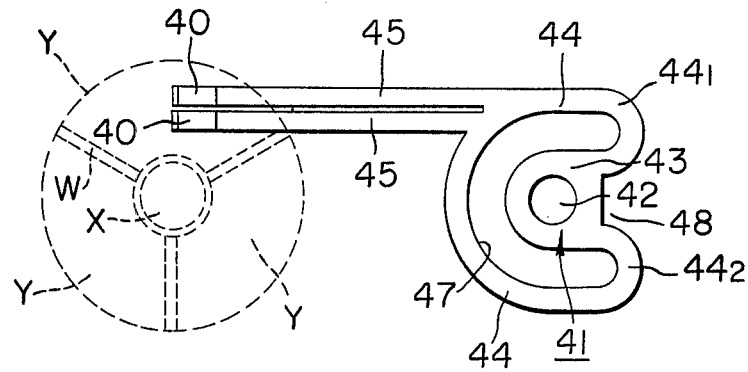
FIG. 4 is a plan view indicating the relative arrangement of the commutator and a conventional brush employed in a small-sized direct current rotary electric appliance utilizing a flat commutator.
Figure 5:
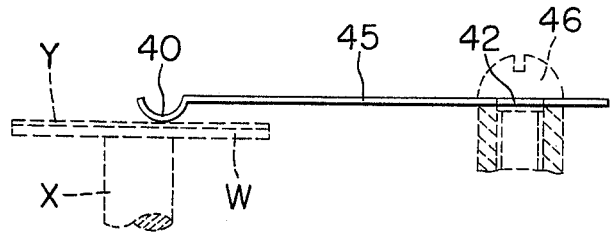
FIG. 5 is a side elevational view corresponding to FIG. 4.

Also, German DAS No. 1,293,318 discloses a brush configuration as shown in FIGS. 4 and 5 of the accompanying drawing, wherein it is so constructed that a plate spring 41 of a laterally elongated shape is provided at approximately the center part 39 thereof with a fitting hole 42 for inserting a fitting rivet 46, then a U-shaped opening 47 of a desired width is punched out around the hole, thereby forming elastic arm portion 44 at both sides of the plate spring 41, further a notch 48 is provided at a position adjacent the fitting hole 42, and at one side of the plate spring 41 between both ends of the opening 47 to supplement elasticity of the arm portion 44, and two contact elements 45 for contacting with the commutator are integrally formed at one side of the arm portion in a manner projecting outwardly therefrom.

However, the conventional brush 41 as shown in FIGS. 4 and 5, similar to that shown in FIGS. 2 and 3, is subjected to the concentrated bending stress to be generated at the connecting portions $44_1$ and $44_2$ between the center part 43 where the fitting hole 42 is formed and the elastic arm portion 44, on account of which breakage or plastic deformation would apprehensively take place with the brush, unless the connecting portions are given sufficiently large mechanical strength. As a consequence, the contact pressure of the contacting parts 40 of the contact element 45 against the commutator must also be increased with the result that friction between the contacting parts 40 of the element 45 and the commutator inevitably increases to impose undesirably high load to the rotary electric appliance. Furthermore, since the contact elements 45 are formed at one side of the arm portions 44 in a manner to project therefrom, a twisting force acts on the connecting portion $44_1$, in particular, to cause the brush 41 as a whole to twist on the fulcrum of the connecting portion $44_2$. Consequently, there arises a problem such that the contact elements 45 do not accurately contact the commutator.

The detailed configuration of the brush to be employed in the small-sized direct current rotary electric appliance according to the present invention is shown in FIGS. 6 and 7, which is composed of a first spring element 51 made of a thin metal plate of a right-angled U-shape, tip end parts 51' to contact the commutator, a second spring element 52 also made of a thin metal plate of a right-angled U-shape, and tip end parts 52" of the second spring element 52 to be fixed to a fixing part 24. These spring elements are integrally formed. As shown in FIG. 7, the first spring element 51 is supported at approximately the center part of the parallel arm portions of a length *a* by the open end parts 52' of the second spring element 52.

As the brush 5 according to the present invention is so constructed as described in the foregoing that the first spring element 51 is supported like a balancing toy at approximately the center part of the parallel arm portions thereof of a length *a* by the open end parts 52' of the second spring element 52, when it receives a repulsive force from the commutator side, the repulsive force can be successfully absorbed in the span between the open end 52' and the fixed end part 52" of the second spring element 52 at the fixing part 24, whereby no excessive stress is concentrated onto a certain single point, but is uniformly acted over the entire brush. Consequently, even if the brush is formed by punching out of an element material in the same size as the brush shown in FIGS. 2–5, the bending amount *f* of the brush is quite satisfactory and its spring characteristic improves higher than in the brush of FIGS. 2–5. Thus, the brush according to the present invention realizes stable contact with the commutator to reduce undesirable noise.

The bending amount *f* of the brush (FIG. 7) is determined by the position of the supporting point of second spring element 52 with respect to the first spring element 51, the width *e* of the supporting point, length *a* and width *c* of the first spring element 51, and the length *b* and width *d* of the second spring element 52. When the bending amount *f* is to be varied, this can be done by adjusting the width *e* of the second spring element without altering the thickness of spring elements.

FIGS. 8 and 9 show another embodiment of the brush to be employed in the small-sized direct current rotary electric appliance of the present invention, wherein the first spring element 51, second spring element 52, and the fixing part 24 for fixing the end part of the second spring element 52 are identical with those in the embodiment shown in FIGS. 6 and 7, so that the corresponding parts are designated by the same reference numerals. The embodiment shown in FIGS. 8 and 9 is further provided with a damper 54 made, for example, of a sponge which extends over a part 51" of the first spring element 51 and the second spring element 52 shown in FIGS. 6 and 7 on the surface side where the brush 5 contacts the commutator, thereby absorbing the chattering and spontaneous vibration of the second spring element so that satisfactory contact between the brush 5 nd the commutator may be maintained.

The brushes shown in FIGS. 6–9 represent preferred embodiments for use in the small-sized direct current rotary electric appliance of the present invention utilizing a flat commutator, although it is also possible to use such brushes in small-sized direct current rotary electric appliances utilizing an ordinary cylindrical commutator. Furthermore, not only the first spring element and the second spring element of the brush may be formed of the same spring plate material, but also the contact end part 51' of the first spring element 51 can be manufactured from a different kind of metallic material such as, for example, a precious metal alloy or carbon black.

What is claimed is:

1. A brush for use in a small-sized, direct current rotary electric machine, comprising:
   a. a first thin, planar elastic member made of an electrically conductive material formed in a substantially elongated U-shape of narrow width, and having a contact portion formed at the open end thereof arranged to be in contact with a commutator in said rotary electric machine; and
   b. a second thin, planar elastic member made of an electrically conductive material in a substantially elongated U-shape having a width broader than the width of said first elastic member, the open end part of which is flexibly connected to said first elastic member at the center side portions of said first elastic member so that same may pivotally swing like a balancing toy with respect to the open end part of said second elastic member, the other end of said second elastic member being arranged to be fixedly maintained at a brush holding position of said rotary electric machine.

2. The brush as set forth in claim 1, wherein said first and second thin, planar elastic members are integrally formed from a single sheet of thin, elastic plate material.

3. A brush for use in a small-sized, direct current rotary electric machine, comprising:
   a. a first, thin, planar elastic member made of an electrically conductive material formed in a substantially elongated U-shape of narrow width, and having a contact portion formed at the open end thereof arranged to be in contact with a commutator in said rotary electric machine;
   b. a second thin, planar elastic member made of an electrically conductive material in a substantially elongated U-shape having a width broader than the width of said first elastic member, the open end part of which is flexibly connected to said first elastic member at the center side portions of said first elastic member so that same may pivotally swing with a balancing toy with respect to the open end part of said second elastic member, the other end portion of said second elastic member being arranged to be fixedly maintained at a brush holding position of said rotary electric machine; and
   c. damper means to absorb spontaneous vibrations of said first and second thin, planar elastic members, said damper means being continuously disposed between a portion of the surface of said first elastic member disposed within the U-shaped region of said second elastic member, and a portion of the surface of said second elastic member.

4. The brush as set forth in claim 3, wherein said first and second thin, planar elastic members are integrally formed from a single sheet of thin, elastic plate material.

5. A small-sized, direct current rotary electric machine comprising:
   a. a stator having a cylindrical permanent magnet;
   b. a rotor arranged to be rotated within the magnetic field of said permanent magnet, said rotor having:
      1. a rotor shaft;
      2. a soft magnetic core fixed on said rotor shaft;
      3. a plurality of windings each having a predetermined number of turns around said core so that the portions of said windings located at both end surfaces of said core in the axial direction thereof constitute terminal connecting portions which are raised above both of the core end surfaces, and the portions thereof located on the periphery of said core in the axial direction thereof are substantially parallel to said rotor shaft; and 4. a commutator plate disposed in at least one of the recesses defined at said both end surfaces of said cores by the terminal connecting portions of said windings and both said core end surfaces, and fixedly disposed on said rotor shaft so as to be substantially perpendicular thereto, said commutator plate having thereon a plurality of commutator elements electrically coupled to the terminals of said plurality of windings;

c. a brush composed of:
1. a first thin, planar elastic member formed in a substantially elongated U-shape having a narrow width; and
2. a second thin, planar elastic member formed in a substantially elongated U-shape having a broader width than that of said first elastic member, at the open end of which a center side portion of said first elastic member is flexibly connected therein so that same may pivotally swing like a balancing toy with respect to said open end, said first thin, planar elastic member having at its open end a contact portion arranged to contact said commutator plate, and said second thin, planar elastic member being fixedly maintained at its closed end to one part of said stator.

6. A rotary electric machine as defined in claim 5, wherein said brush is provided with a damper continuously disposed between portions of adjacent surfaces of said first and second elastic members, and arranged to absorb spontaneous vibrations of said first and second thin, planar elastic members.

* * * * *